United States Patent
Kim et al.

(10) Patent No.: US 9,583,775 B2
(45) Date of Patent: Feb. 28, 2017

(54) FUEL CELL SYSTEM AND ELECTRONIC DEVICE CONTROLLING THE SAME

(71) Applicant: Samsung Electronics Co., Ltd., Suwon-si, Gyeonggi-do (KR)

(72) Inventors: Young-jae Kim, Seoul (KR); Hye-jung Cho, Anyang-si (KR); Jin-ho Kim, Seoul (KR); Hyuk Chang, Seongnam-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 823 days.

(21) Appl. No.: 13/947,397

(22) Filed: Jul. 22, 2013

(65) Prior Publication Data

US 2014/0114447 A1    Apr. 24, 2014

(30) Foreign Application Priority Data

Oct. 24, 2012  (KR) .................. 10-2012-0118680

(51) Int. Cl.
  *H01M 8/04*   (2016.01)
  *G05B 15/02*  (2006.01)
  *H04L 12/64*  (2006.01)

(52) U.S. Cl.
  CPC ........ *H01M 8/04992* (2013.01); *G05B 15/02* (2013.01); *H01M 8/04298* (2013.01); *H01M 8/04932* (2013.01); *H04L 12/6418* (2013.01)

(58) Field of Classification Search
  CPC ......... H01M 8/04992; H01M 8/04298; H01M 8/04932; H04L 12/6418; G05B 15/02; Y02E 60/50
  See application file for complete search history.

(56) References Cited

U.S. PATENT DOCUMENTS 7,443,133 B2 * 10/2008 Hamada .............. H01M 8/0432
  320/101
7,449,259 B2 * 11/2008 Zhu .................... B60L 11/1887
  429/422
7,645,536 B2 *  1/2010 Akiyama .......... H01M 8/04208
  137/255

(Continued)

FOREIGN PATENT DOCUMENTS

JP   2003519429 A   6/2003
JP   2005135762 B2  5/2005

(Continued)

*Primary Examiner* — Charles Kasenge
(74) *Attorney, Agent, or Firm* — Cantor Colburn LLP

(57) ABSTRACT

A method of operating a fuel cell system which is controlled by an electronic device includes: transmitting a bit stream including a bit string which indicates identification information of the fuel cell system and a bit string which indicates status information of the fuel cell system to the electronic device through a serial communication line; receiving a bit stream including a bit string which indicates control information of the fuel cell system from the electronic device through the serial communication line; obtaining the control information of the fuel cell system from the received bit stream; and controlling power production of a fuel cell by controlling operations of peripheral devices of the fuel cell system based on the obtained control information of the fuel cell system.

21 Claims, 8 Drawing Sheets

(56) References Cited

U.S. PATENT DOCUMENTS

| | | | |
|---|---|---|---|
| 7,807,307 B2 * | 10/2010 | Black | H01M 8/04201 429/428 |
| 7,947,402 B2 | 5/2011 | Kim et al. | |
| 8,399,141 B2 | 3/2013 | Kim et al. | |
| 8,722,261 B2 | 5/2014 | Joung et al. | |
| 8,722,282 B2 | 5/2014 | Cho et al. | |
| 9,029,029 B2 | 5/2015 | Hu et al. | |
| 2002/0031219 A1 * | 3/2002 | Gutsche | H04L 9/0662 380/28 |
| 2005/0154946 A1 * | 7/2005 | Mitbander | G06F 11/221 714/724 |
| 2005/0267788 A1 * | 12/2005 | Brown | G06Q 10/06 700/100 |
| 2006/0251936 A1 * | 11/2006 | Black | H01M 8/04201 429/443 |
| 2007/0026716 A1 * | 2/2007 | Zhang | H04L 25/40 439/260 |
| 2009/0021965 A1 | 1/2009 | Kim et al. | |
| 2009/0176132 A1 | 7/2009 | Kim et al. | |
| 2009/0226772 A1 * | 9/2009 | Stark | H01M 8/04201 429/431 |
| 2011/0311895 A1 * | 12/2011 | Spare | H01M 8/04201 429/430 |
| 2011/0313589 A1 * | 12/2011 | Iyer | H01M 8/04201 700/297 |
| 2012/0064418 A1 | 3/2012 | Heo et al. | |
| 2012/0178008 A1 | 7/2012 | Heo et al. | |
| 2012/0258385 A1 | 10/2012 | Hu et al. | |
| 2013/0175114 A1 | 7/2013 | Heo et al. | |
| 2013/0189597 A1 | 7/2013 | Kim et al. | |
| 2014/0159506 A1 | 6/2014 | Kim et al. | |

FOREIGN PATENT DOCUMENTS

| | | |
|---|---|---|
| KR | 20000048485 A | 7/2000 |
| KR | 1020070035892 A | 4/2007 |
| KR | 1020070059500 A | 6/2007 |
| KR | 1020070073113 A | 1/2009 |
| KR | 1020090008066 A | 1/2009 |
| KR | 1020090095007 A | 9/2009 |
| KR | 1020100081834 A | 7/2010 |
| KR | 1020100108761 A | 10/2010 |
| KR | 1020120026837 A | 3/2012 |
| KR | 1020120080881 A | 7/2012 |
| KR | 1020120115822 A | 10/2012 |
| KR | 1020120006408 A | 7/2013 |
| KR | 1020130082305 A | 7/2013 |
| KR | 1020090032827 A | 5/2014 |
| KR | 1020120144802 A | 6/2014 |

\* cited by examiner

FIG. 4

| B<br>T | B3 | B2 | B1 | B0 |
|---|---|---|---|---|
| 1~10 | 0 | 0 | 0 | 0 |
| 11~20 | 0 | 0 | 0 | 1 |
| ⋮ | ⋮ | ⋮ | ⋮ | ⋮ |
| 81~90 | 1 | 0 | 0 | 1 |
| 91~100 | 1 | 0 | 1 | 0 |

FUEL CELL SYSTEM AND ELECTRONIC DEVICE CONTROLLING THE SAME

CROSS-REFERENCE TO RELATED APPLICATIONS

This application claims priority to Korean Patent Application No. 10-2012-0118680, filed on Oct. 24, 2012, and all the benefits accruing therefrom under 35 U.S.C. §119, the content of which in its entirety is herein incorporated by reference.

BACKGROUND

1. Field

The disclosure relates to a fuel cell system and an electronic device that controls the fuel cell system.

2. Description of the Related Art

Fuel cells are environmentally friendly alternative energy sources for generating electric energy from abundant materials on the Earth, e.g., hydrogen, and are becoming as popular as solar cells, for example. A portable fuel cell system may be realized due to the advent of a direct methanol fuel cell ("DMFC"), in which methanol may not be reformed, and the size of which is thereby substantially reduced. Accordingly, interest in the development of a fuel cell system, which may be used as a portable charger of a portable electronic device such as a smart phone, a tablet, a mobile phone or a notebook, for example, is increasing.

SUMMARY

Provided are embodiments of a device and a method of exchanging information between a fuel cell system and an electronic device and embodiments of the fuel cell system and the electronic device.

Additional aspects will be set forth in part in the description which follows and, in part, will be apparent from the description, or may be learned by practice of the embodiments set forth herein.

According to an embodiment of the invention, a method of operating a fuel cell system which is controlled by an electronic device includes: transmitting a bit stream including a bit string which indicates identification information of the fuel cell system and a bit string which indicates status information of the fuel cell system to the electronic device through a serial communication line; receiving a bit stream including a bit string which indicates control information of the fuel cell system from the electronic device through the serial communication line; obtaining the control information of the fuel cell system from the received bit stream; and controlling power production of a fuel cell by controlling operations of peripheral devices of the fuel cell system based on the obtained control information of the fuel cell system.

In an embodiment, the method may further include generating the bit stream, which is transmitted to the electronic device, by generating the bit string which indicates the status information by encoding the status information and then adding the bit string which indicates the status information after the bit string which indicates the identification information. In an embodiment, the generating the bit stream may include encoding the status information of the fuel cell system by combining binary codes corresponding to status information of components of the fuel cell system based on a predetermined order.

In an embodiment, the generating the bit stream may further include converting the status information of the components of the fuel cell system into binary values and determining the converted binary values as the binary codes corresponding to status information. In an embodiment, the generating the bit stream may further include extracting a plurality of binary codes, which is mapped into a plurality of sections, from a predetermined table, and determining the extracted binary codes as the binary codes corresponding to status information, where the sections may correspond to the status information of a component of the fuel cell system, and the sections, which are obtained by dividing a total range of a changeable status of the component of the fuel cell system, and the binary codes may be mapped to each other in one-to-one correspondence in the predetermined table.

In an embodiment, the generating the bit stream may include generating the bit stream by adding a start bit string having a predetermined pattern, which indicates the start of transmission of the identification information of the fuel cell system, before the bit string which indicates the identification information. In an embodiment, the method may further include transmitting a bit stream including a bit string which indicates a portion of the identification information of the fuel cell system and a bit string which indicates a portion of the status information of the fuel cell system.

According to another embodiment of the invention, a fuel cell system which is controlled by an electronic device includes: a fuel cell which produces power using a fuel; a balance of plants ("BOP") which supplies the fuel to the fuel cell; a controller which generates a bit string which indicates status information of the fuel cell system by encoding the status information and controls a power production of the fuel cell by controlling an operation of the BOP based on control information of the fuel cell system; and an interface which transmits a bit stream including the generated bit string to the electronic device through a serial communication line and receives a bit stream including a bit string which indicates the control information of the fuel cell system from the electronic device through the serial communication line.

In an embodiment, the controller may generate the bit stream, which is transmitted to the electronic device, by adding the bit string which indicates the status information after a bit string which indicates identification information of the fuel cell system. In an embodiment, the interface may receive power from the electronic device or may supply power to the electronic device, through a power line which is different from the serial communication line. In an embodiment, the interface may receive power from the electronic device or may supply power to the electronic device, through the serial communication line. In an embodiment, the interface may supply power to the electronic device by transmitting successive bits corresponding to maximum transmissible voltage values of a signal to the electronic device after the transmitted bit stream.

According to another embodiment of the invention, a method of controlling a fuel cell system using an electronic device includes: receiving a bit stream including a bit string which indicates identification information of the fuel cell system and a bit string which indicates status information of the fuel cell system from the fuel cell system through a serial communication line; obtaining the identification information of the fuel cell system and the status information of the fuel cell system from the received bit stream; generating control information of the fuel cell system based on the obtained identification information and the obtained status information; generating a bit stream including a bit string which indicates the control information of the fuel cell system; and transmitting the generated bit stream to the fuel cell system through the serial communication line.

In an embodiment, the obtaining the identification information of the fuel cell system and the status information of the fuel cell system may include obtaining the status information by decoding the bit string which indicates the status information which is received after the bit string which indicates the identification information of the fuel cell system. In an embodiment, the obtaining the identification information of the fuel cell system and the status information of the fuel cell system may further include extracting each of binary codes corresponding to status information of components of the fuel cell system based on a predetermined order from the bit string which indicates the status information of the fuel cell system, and decoding the bit string which indicates the status information of the fuel cell system by determining status information corresponding to each of the binary codes.

In an embodiment, the obtaining the identification information of the fuel cell system and the status information of the fuel cell system may further include determining a binary value of each of the extracted binary codes as the status information of each of the components of the fuel cell system. In an embodiment, the obtaining the identification information of the fuel cell system and the status information of the fuel cell system may further include detecting a section mapped to each of the extracted binary codes from a table, in which a plurality of sections, which are obtained by dividing a total range of a changeable status of a component of the fuel cell system, and a plurality of binary codes is mapped to each other in one-to-one correspondence, and determining a value which represents the detected section as the status information of the components of the fuel cell system.

In an embodiment, the obtaining the identification information of the fuel cell system and the status information of the fuel cell system may further include obtaining the identification information by extracting a bit string having a predetermined length, which is first received from the fuel cell system, as the identification information, and obtaining the status information by decoding a bit string which is received after the bit string having the predetermined length. In an embodiment, the obtaining the identification information of the fuel cell system and the status information of the fuel cell system may further include monitoring signals received from the fuel cell system, obtaining the identification information by extracting a bit string having a predetermined length, which is received after a start bit string of a predetermined pattern, as the identification information when the start bit string of the predetermined pattern, which indicates the start of transmission of information of the fuel cell system, is detected during the monitoring, and obtaining the status information by decoding a bit string which is received after the bit string having the predetermined length. In an embodiment, the method may further include transmitting a bit stream including a bit string which indicates a portion of the identification information of the fuel cell system and a bit string which indicates a portion of the control information of the fuel cell system.

In an embodiment, the generating the control information may include determining specifications of the fuel cell system from the identification information of the fuel cell system, and generating the control information of the fuel cell system based on the specifications of the fuel cell system and the status information of the fuel cell system. In an embodiment, the generating the control information may include generating the control information of the fuel cell system based on the status information of the fuel cell system using an operational algorithm of the fuel cell system, which corresponds to the identification information of the fuel cell system. In an embodiment, the generating of the control information may include determining a type of a fuel cell from the identification information of the fuel cell system, and generating the control information of the fuel cell system using an operational algorithm corresponding to the type of the fuel cell, which is selected from among various operational algorithms corresponding to various types of the fuel cell based on the type of the fuel cell.

In an embodiment, the generating the control information may further include determining an environment of the fuel cell system based on environment information of a region, at which the electronic device is located, and generating the control information of the fuel cell system using an algorithm corresponding to the environment of the fuel cell system, which is selected from among various operational algorithms corresponding to various environments based on the environment of the fuel cell system. In an embodiment, the generating the control information may include selecting one of a plurality of operational modes including a start-up mode for starting up a fuel cell and a normal mode, in which power is supplied from the fuel cell system to the electronic device, based on the status information of the fuel cell system, and generating the control information of the fuel cell system based on a selected operational mode.

In an embodiment, the generating the control information may include calculating a value which indicates additional status information of the fuel cell system from a value which indicates status information of a component of the fuel cell system, and generating the control information of the fuel cell system based on the status information of the component and the additional status information.

According to another embodiment of the invention, an electronic device for controlling a fuel cell system includes: a processor which generates control information of the fuel cell system based on status information of the fuel cell system and generates a bit string which indicates the control information by encoding the generated control information; and an interface which receives a bit stream including a bit string which indicates the status information of the fuel cell system from the fuel cell system through a serial communication line and transmits a bit stream including the generated bit string to the fuel cell system through the serial communication line.

In an embodiment, the received bit stream may further include a bit string which indicates identification information of the fuel cell system, and the processor may obtain the identification information and the status information from the received bit stream and may generate the control information of the fuel cell system based on the obtained identification information and status information. In an embodiment, the interface may receive power from the fuel cell system or may supply power to the fuel cell system, through a power line which is different from the serial communication line. In an embodiment, the interface may receive power from the fuel cell system or may supply power to the fuel cell system, through the serial communication line. In an embodiment, the interface may supply power to the fuel cell system by transmitting successive bits corresponding to maximum transmissible voltage values of a signal to the fuel cell system after the transmitted bit stream.

BRIEF DESCRIPTION OF THE DRAWINGS

These and/or other features will become apparent and more readily appreciated from the following description of the embodiments, taken in conjunction with the accompanying drawings, in which:

FIG. 4 is a diagram illustrating an embodiment of a mapping table of binary codes according to the invention;

DETAILED DESCRIPTION

Figure 1:
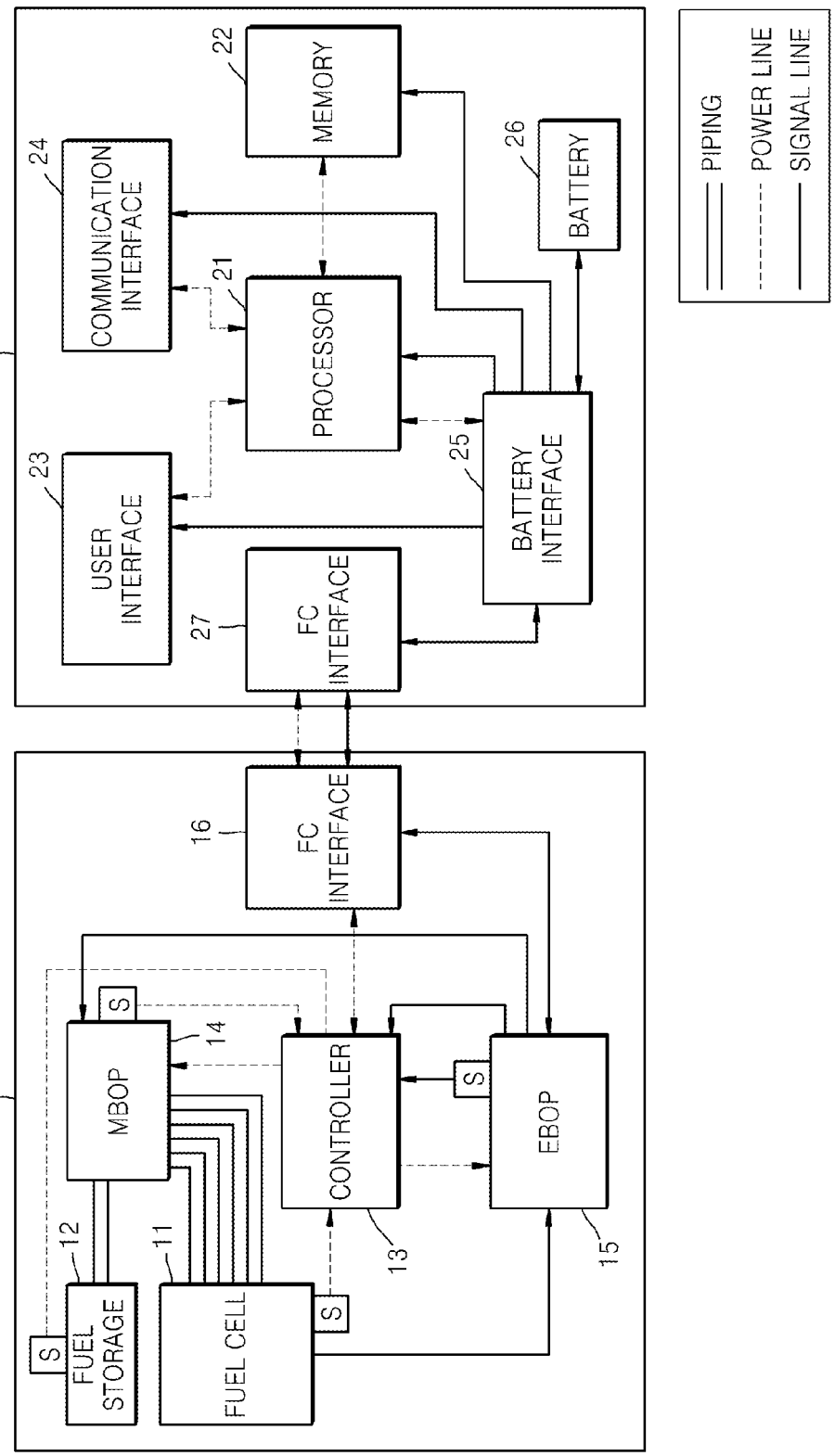
FIG. 1 is a block diagram illustrating a configuration of an embodiment of a fuel cell system and a configuration of an embodiment of an electronic device according to the invention.

The invention will be described more fully hereinafter with reference to the accompanying drawings, in which embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

A fuel cell system generally includes a fuel cell for generating power, a mechanical balance of plants ("MBOP"), which includes peripheral devices of the fuel cell for supplying a fuel and air, for example, to the fuel cell, and an electrical balance of plants ("EBOP"), which includes peripheral devices for supplying the power generated by the fuel cell to a load by performing a conversion of an output voltage of the fuel cell. Hereinafter, methods and elements of the fuel cell system and an electronic device, which are relate to an exchange of information between the fuel cell system and an electronic device, will now be described in greater detail, while detailed description on configurations of the fuel cell system and configurations of the electronic device, which are well known in the art, will herein be simplified or omitted for convenience of description. Generally, a fuel cell is designed in a form of a stack, in which a plurality of cells are coupled in series or in parallel according to power required by a load. Hereinafter, both a single cell and a stack, in which a plurality of cells are coupled to each other, will now be referred to as a fuel cell.

Hereinafter, embodiments of the invention will be described in further detail with reference to the accompanying drawings.

FIG. 1 is a block diagram illustrating an embodiment of a fuel cell system 1 and an electronic device 2 according to the invention. Referring to FIG. 1, the fuel cell system 1 includes a fuel cell 11, a fuel storage 12, a controller 13, an MBOP 14, an EBOP 15 and a fuel cell ("FC") interface 16. The fuel cell 11, the fuel storage 12, the MBOP 14 and the EBOP 15 include sensors for measuring various state values of the fuel cell system 1. In an embodiment, a sensor is disposed in each of the fuel cell 11, the fuel storage 12, the MBOP 14 and the EBOP 15. In an alternative embodiment, the sensor may be disposed in some of the fuel cell 11, the fuel storage 12, the MBOP 14 and the EBOP 15.

The fuel cell 11 is a power generating device that produces direct current ("DC") power by directly converting chemical energy of a fuel to electric energy via an electrochemical reaction. In an embodiment, the fuel cell 11 may be one of various types of fuel cell including a solid oxide fuel cell ("SOFC"), a polymer electrolyte membrane fuel cell ("PEMFC") or a direct methanol fuel cell ("DMFC"), for example. The fuel storage 12 is a container in which high concentration fuel, e.g., about 100% methanol, is stored and may be configured to have a predetermined shape, such as a cylindrical shape or a box shape, for example, but not being limited thereto. In an alternative embodiment, the fuel storage 12 may have any of various shapes. In an embodiment, the fuel storage 12 may be configured to be detachably attached to the fuel cell system 1 shown in FIG. 1 and may be referred to as a cartridge.

The controller 13 controls the power generation of the fuel cell 11 by controlling operations of the MBOP 14 and the EBOP 15. In an embodiment, the controller 13 generates a bit string that indicates status information of the fuel cell system 1 by encoding the status information of the fuel cell system 1, and generates a bit stream, which includes a bit string that indicates identification information of the fuel cell system 1 and the bit string that indicates the status information of the fuel cell system 1, by adding the bit string that indicates the status information of the fuel cell system 1 after, e.g., subsequent to or to the back of, the bit string that indicates the identification information of the fuel cell system 1. Accordingly, in such an embodiment, information is effectively exchanged between the fuel cell system 1 and the electronic device 2 regardless of a type and model of the fuel cell system 1. In an embodiment, an encoding format of the status information of the fuel cell system 1 is the same regardless of the type and model of the fuel cell system 1, and the electronic device 2 may comprehend and decode a received bit stream when the electronic device 2 receives a bit stream from various types or models of fuel cell system 1.

The controller 13 obtains control information of the fuel cell system 1 by decoding a bit string that indicates the control information of the fuel cell system 1, which is included in a bit stream transmitted from the electronic device 2, and controls the power generation of the fuel cell 11 by controlling the operations of the MBOP 14 and the EBOP 15 based on the decoded control information. In an embodiment, the controller 13 may not perform various data processes and operations, which are required for the generation of the control information of the fuel cell system 1. In such an embodiment, the controller 13 performs only encoding of the status information of the fuel cell system 1 and decoding of the bit string that indicates the control information of the fuel cell system 1. In one embodiment, for example, the controller 13 may be implemented with a read only memory ("ROM"), in which a program for encoding and decoding as described above has been stored, a random access memory ("RAM") for temporarily storing data, and a low performance processor for executing the program stored in the ROM using a data storage function of the RAM.

The MBOP 14 includes peripheral devices for driving the fuel cell 11 by supplying a fuel, air and/or the like, to the fuel cell 11 based on the control of the controller 13. The MBOP 14 includes a fuel pump for supplying a fuel to the fuel cell 11, an air pump for supplying air to the fuel cell 11, and a water pump for supplying water for diluting a highly concentrated fuel stored in the fuel storage 12 or supplying a coolant for cooling the fuel cell 11 to the fuel cell 11. The EBOP 15 includes peripheral devices for supplying power generated by the fuel cell 11 to a load by performing the output voltage conversion of the fuel cell 11 based on the control of the controller 13. The load may be components included in the fuel cell system 1, e.g., the controller 13, the MBOP 14, the FC interface 16, and sensors, and a battery 26 of the electronic device 2. As described below, based on the state of the fuel cell system 1 and the state of the electronic device 2, the load may include only the components of the fuel cell system 1 or may further include another load of the electronic device 2 other than the battery 26. In FIG. 1, a power line that indicates power that is supplied to the sensors is omitted for convenience of illustration.

In an embodiment, the EBOP 15 may include only a single DC/DC converter. In an alternative embodiment, the EBOP 15 may include a plurality of DC/DC converters. In one embodiment, for example, when a voltage of power that is supplied to the components of the fuel cell system 1 is different from that of power that is supplied to the electronic device 2 through the FC interface 16, the EBOP 15 include at least two DC/DC converters. In an embodiment, the electronic device 2, e.g., smart phones that are recently widely used, may include a battery charging circuit therein. However, in an alternative embodiment, the electronic device 2 may not include the battery charging circuit therein. In an embodiment, where the electronic device 2 does not have a function of charging the battery 26, the EBOP 15 may further include a circuit for performing a function of charging the battery 26 of the electronic device 2 as well as a circuit for performing the voltage conversion function described above.

The FC interface 16 transmits a bit stream generated by the controller 13 to the electronic device 2 through a serial communication line, and receives a bit stream including the bit string that indicates the control information of the fuel cell system 1 from the electronic device 2 through the serial communication line. The serial communication line may be a wired communication line or a wireless communication line. The FC interface 16 may also perform operations such as synchronization with the electronic device 2 and packetization of the bit stream to enable such serial communication. Since the FC interface 16 may be designed in any of various forms as illustrated in FIG. 7, the FC interface 16 may also be designed in a form of a conventional interface. In one embodiment, for example, the FC interface 16 may also be designed in a form of a universal serial bus ("USB").

Referring to FIG. 1, the electronic device 2 includes a processor 21, a memory 22, a user interface 23, a communication interface 24, a battery interface 25, the battery 26 and an FC interface 27. In an embodiment, the electronic device 2 may be a portable electronic device such as a smart phone, a tablet, a mobile phone or a notebook, for example, but not being limited thereto.

The processor 21 obtains the identification information of the fuel cell system 1 and the status information of the fuel cell system 1 from the bit stream including the bit string that indicates the identification information of the fuel cell system 1 and the bit string that indicates the status information of the fuel cell system 1. In an embodiment, the processor 21 obtains the status information of the fuel cell system 1 by decoding the bit string that indicates the status information of the fuel cell system 1, and generates the control information of the fuel cell system 1 based on the identification information and status information of the fuel cell system 1. In an embodiment, where the electronic device 2 is a smart phone including a high performance processor, various data processes and operations for the generation of the control information of the fuel cell system 1 may be effectively performed by the smart phone.

In an embodiment, the processor 21 generates the bit stream including the bit string indicating the control information of the fuel cell system 1 by encoding the control information of the fuel cell system 1 such that information is effectively exchanged between the fuel cell system 1 and the electronic device 2, which may be one various types and models of electronic device. In such an embodiment, an encoding format of the status information of the electronic device 2 is the same regardless of the type and model of the electronic device 2, such that the fuel cell system 1 may comprehend and decode a received bit stream when the fuel cell system 1 receives a bit stream from various types and models of electronic device.

The memory 22 stores a program for generating the control information of the fuel cell system 1. In an embodiment, the memory 22 may store various operational algorithms corresponding to characteristics of the fuel cell 11, e.g., a type of the fuel cell 11 or a use environment of the fuel cell 11. In an embodiment, where the electronic device 2 is a smart phone, storing such a program and algorithm may be performed by installing an application, which downloads such a program and algorithm from a server in a network, on the smart phone. In such an embodiment, the user interface 23 may output an image for providing any information to a user or receives any information or command from a user, based on the control of the processor 21. In one embodiment, the user interface 23 may be implemented with a display panel or a touch panel, for example. In one embodiment, the user interface 23 may provide information on the fuel cell system 1, e.g., safety and convenience in using the fuel cell system 1, by displaying status information of the fuel cell system 1 and a normality or abnormality of the fuel cell system 1 to a user.

The communication interface 24 performs communication with another electronic device in the network based on the control of the processor 21. In an embodiment, the network may include a wireless local area network ("LAN"), a wired LAN, or the Internet, for example. In an embodiment, the battery interface 25 supplies power to the battery 26 or receives power from the battery 26 to supply the retrieved power to a load based on the control of the processor 21. The load may be the processor 21, the memory 22 and the FC interface 27 of the electronic device 2, and the controller 13, the MBOP 14, the EBOP 15 and the FC interface 16 of the fuel cell system 1. In an embodiment, as described below, the load may include only the processor 21, the memory 22 and the FC interface 27 of the electronic device 2 according to the state of the fuel cell system 1 and the state of the electronic device 2. In an alternative embodiment, the load 4 may further include the user interface 23 and the communication interface 24 of the electronic device 2.

In an embodiment, the battery interface 25 may perform a function of charging the battery 26. In such an embodiment, the fuel cell system 1 may not include a circuit for performing a function of charging the battery 26. In an embodiment, the battery 26 is a secondary cell. In one embodiment, the battery 27 may be a lithium cell, a nickel-cadmium cell, or a nickel-hydrogen cell. The processor 21 may perform a hybrid operation for supplying at least one of power outputted from the fuel cell 11 and power outputted from the battery 26 to the load.

The FC interface 27 receives a bit stream that indicates the status information of the fuel cell system 1 from the fuel cell system 1 through the serial communication line, or transmits a bit stream including a bit string generated by the processor 21 to the fuel cell system 1 through the serial communication line. The FC interface 27 may perform operations such as synchronization with the fuel cell system 1 and packetization of the bit stream in a manner substantially the same as the FC interface 16 of the fuel cell system 1. In such an embodiment, a method in which the FC interface 16 of the fuel cell system 1 and the FC interface 27 of the electronic device 2 may communicate with each other through a serial communication line is used, such that a communication between the fuel cell system 1 and the electronic device 2 is effectively implemented via a general purpose serial communication method.

Figure 2:
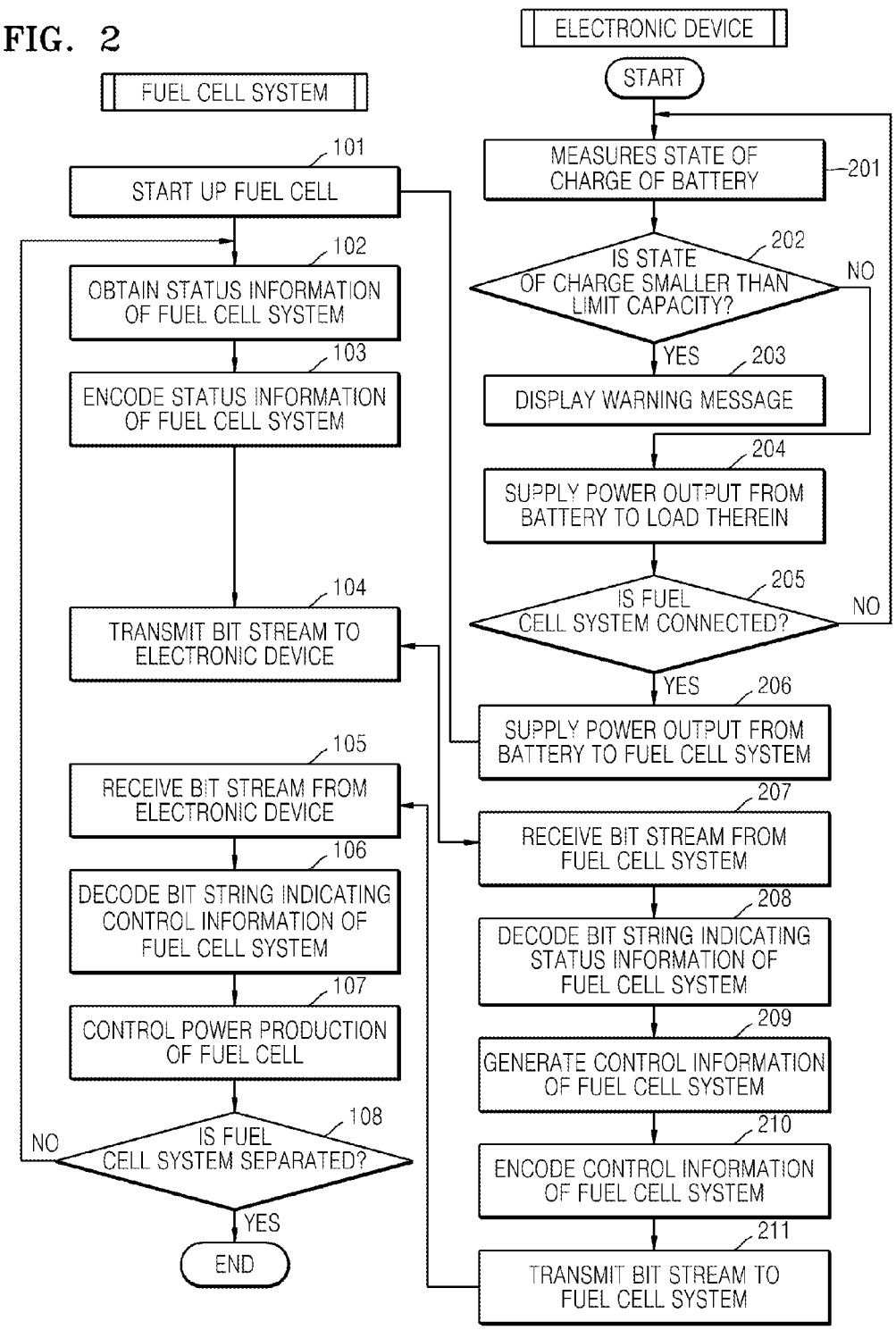
FIG. 2 is a flowchart illustrating an embodiment of a method of operating a fuel cell system and controlling an electronic device according to the invention.

FIG. 2 is a flowchart illustrating an embodiment of a method of operating the fuel cell system 1 and controlling the electronic device 2 according to an embodiment of the invention. Hereinafter, operations of the fuel cell system 1 and the electronic device 2 are described in greater detail with reference to the flowchart illustrated in FIG. 2.

Referring to FIGS. 1 and 2, in operation 201, the electronic device 2 measures a state of charge ("SOC") of the battery 26 using at least one of an output current value and an output voltage value of the battery 26. The processor 21 may measure the SOC of the battery 26 by calculating the SOC using at least one of the output current value and the output voltage value of the battery 26, which are measured by the battery interface 25. In an embodiment, a method of measuring the SOC of the battery 26 may include a chemical method, a voltage method, a current integration method, or a pressure method, for example. In an embodiment of the fuel cell system illustrated in FIG. 1, the voltage method or the current integration method may be used. The voltage method is a method of measuring the current output voltage of the battery 26 and calculating the SOC by comparing the measured output voltage with a discharge curve of the battery 26. The current integration method is a method of calculating the SOC by measuring an output current of the battery 26 for the whole usage time and integrating the measured output current.

In operation 202, the processor 21 of the electronic device 2 compares the current SOC of the battery 26, which has been measured in operation 201, with a limit capacity of the battery 26, which is a minimum power to start up the fuel cell system 1. When the current SOC of the battery 26 is less than the limit capacity of the battery 26, operation 203 is performed. When the current SOC of the battery 26 is equal to or greater than the limit capacity of the battery 26, operation 204 is performed. In such an embodiment, the limit capacity of the battery 26 may be set to be greater than a limit capacity of a general electronic device that does not use the fuel cell system 1 in charging a battery to allow minimum power to start up the fuel cell system 1 to be constantly stored in the battery 26 of the electronic device 2.

In operation 203, the user interface 23 of the electronic device 2 displays a warning message for indicating that the current SOC of the battery 26 is less than the limit capacity of the battery 26 according to the control of the processor 23. When a user is provided with the warning message, the user may charge the battery 26 using another power source other than the fuel cell system 1, for example, a household power source.

In operation 204, the battery interface 25 of the electronic device 2 supplies power output from the battery 26 to a load of the electronic device 2, for example, the communication interface 24 of the electronic device 2 according to the control of the processor 21. In such an embodiment, when the power is supplied to the communication interface 24, the communication interface 24 may perform communication with another electronic device located in a network, e.g., a wireless LAN, a wired LAN or the Internet. In an embodiment, as described above, the load of the electronic device 2 may be the communication interface 24, but not being limited thereto. In an alternative embodiment, the load of the electronic device 2 may be a component that uses power for the electronic device 2 to operate any application program.

In operation 205, the processor 21 of the electronic device 2 determines whether the fuel cell system 1 is connected to the electronic device 2. When it is determined that the fuel cell system 1 is connected to the electronic device 2, operation 206 is performed. When it is determined that the fuel cell system 1 is not connected to the electronic device 2, operation 201 is performed again. The processor 21 may determine whether the fuel cell system 1 is connected to the electronic device 2 based on a signal that is generated by a mechanical coupling between the FC interface 16 of the fuel cell system 1 and the FC interface 27 of the electronic device 2. In one embodiment, for example, a switch that is operated when the FC interface 16 of the fuel cell system 1 and the FC interface 27 of the electronic device 2 are coupled to each other by a user may be provided in the FC interface 27 of the electronic device 2, and the processor 21 may determine whether the fuel cell system 1 is connected to the electronic device 2, based on a signal from the switch, e.g., an switch-on signal or an switch-off signal.

In operation 206, the battery interface 25 of the electronic device 2 supplies power output from the battery 26 to the fuel cell system 1 through a power line of the FC interface 27 according to the control of the processor 21. The power supplied to the fuel cell system 1 in operation 206 is used to start up the fuel cell 11. When the power for starting up the fuel cell 11 is supplied to the fuel cell system 1 through the power line of the FC interface 16 in operation 101, the controller 13 of the fuel cell system 1 controls the MBOP 14 and the MBOP 14 supplies fuel and air to the fuel cell 11 according to the control of the controller 14.

In operation 102, the controller 13 of the fuel cell system 1 obtains status information of the fuel cell system 1. The controller 13 may obtain status information of components of the fuel cell system 1 from sensors provided, e.g., installed, in the fuel cell 11, the fuel storage 12, the MBOP 14 and the EBOP 15. In one embodiment, for example, the controller 13 of the electronic device 2 may obtain the current temperature of the fuel cell 11 from a sensor installed in the fuel cell 11, may obtain the current remaining fuel capacity from a sensor installed in the fuel storage 11, and may obtain an output voltage and output current of the fuel cell 11 from a sensor installed in a power line of the output side of the fuel cell 11, which is included in the EBOP 15. In an embodiment, the controller 13 of the electronic device 2 may obtain the current oil pressure of the input side of the fuel cell 11 from a sensor installed in the piping of the input side of the fuel cell 11, which is included in the MBOP 14, and may obtain the current oil pressure of the output side of the fuel cell 11 from a sensor installed in the piping of the output side of the fuel cell 11.

In operation 103, the controller 13 of the fuel cell system 1 generates a bit stream including a bit string that indicates identification information of the fuel cell system 1 and a bit string that indicates the status information of the fuel cell system 1, which is obtained in operation 102. The controller 13 may generate the bit string that indicates the status information of the fuel cell system 1 by encoding the status information of the fuel cell system 1, which is obtained in operation 102, and may generate the bit stream, which includes the bit string that indicates the identification information of the fuel cell system 1 and the bit string that indicates the status information of the fuel cell system 1, by adding the bit string that indicates the status information of the fuel cell system 1 after, e.g., subsequent to or to the back of, the bit string that indicates the identification information of the fuel cell system 1. In an embodiment, the bit string that indicates the identification information of the fuel cell system 1 may be stored in a register or memory of the controller 13 in advance. The controller 13 may read the bit string stored in the register or memory and may add the bit string that indicates the status information of the fuel cell system 1 to the back of the read bit string.

Hereinafter, the bit stream will be described in greater detail with reference to FIGS. 3 to 4.

Figure 3:
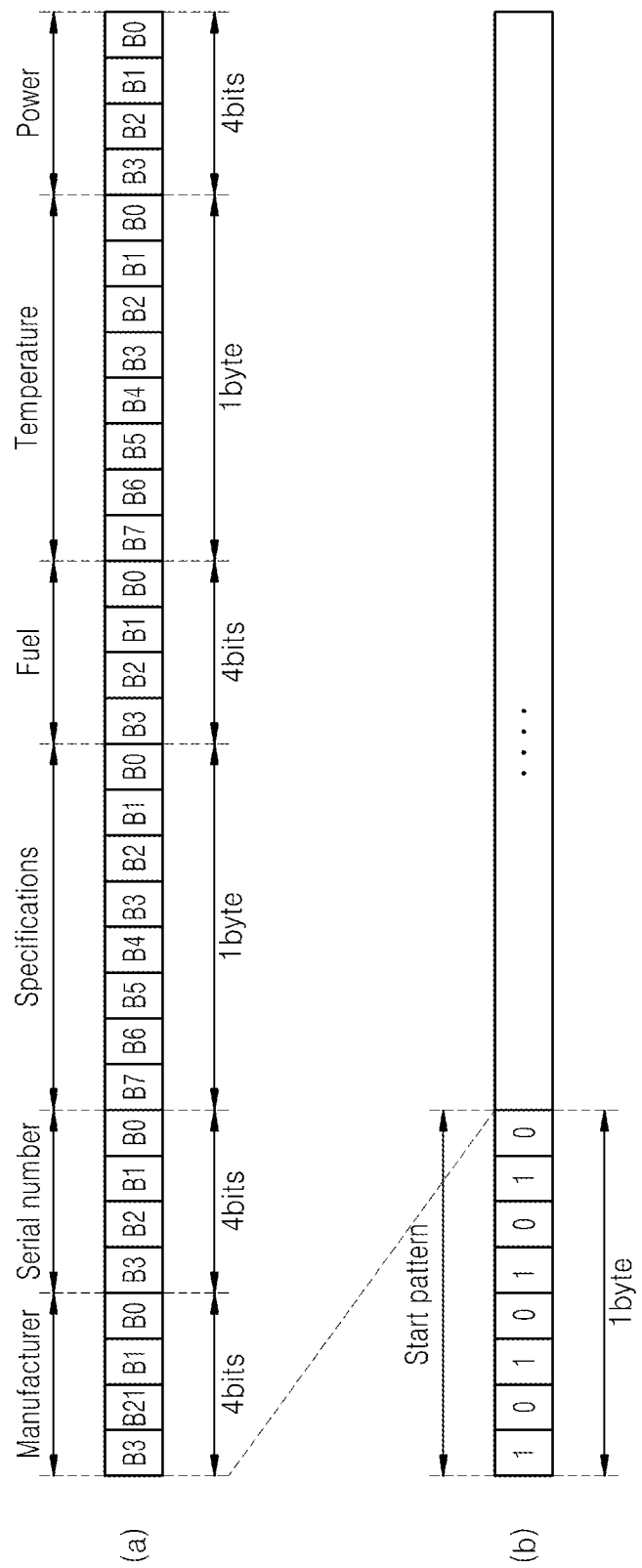
FIG. 3 is a diagram illustrating a format of an embodiment of a bit stream that is transmitted by a fuel cell system according to the invention.

FIG. 3 is a diagram illustrating a format of an embodiment of a bit stream that is transmitted by the fuel cell system 1 according to the invention. Referring to FIG. 3, a bit string that indicates identification information of the fuel cell system 1 includes four bits that indicates a manufacturer of the fuel cell 11, four bits that indicates a serial number of the fuel cell 11, and one byte that indicates specifications of the fuel cell 11. In one embodiment, for example, the specifications of the fuel cell 11 may include a rated power, rated voltage and rated current of a fuel cell stack. In an embodiment, one byte is assigned to the specifications of the fuel cell 11 as a great number of bits may be used when compared to other identification information elements to represent the specifications of the fuel cell 11. In an embodiment, identification information elements of the identification information of the fuel cell system 1 may be represented as bit strings of the same length, as shown in (a) of FIG. 3 but not being limited thereto. In an alternative embodiment, the identification information elements of the identification information of the fuel cell system 1 may be represented as bit strings of different lengths. In an embodiment, similarly to the identification information, status information or control information of the fuel cell system 1 may also be represented as bit strings of the same length or different lengths. The bit string that indicates the identification information of the fuel cell system 1 may further include a bit string that indicates information other than the information described above. In one embodiment, for example, the bit string that indicates the identification information of the fuel cell system 1 may further include a bit string that indicates a type of the fuel cell 11, a bit string that indicates a manufacturing year/month/day of the fuel cell 11, and a bit string that indicates a total operable time of the fuel cell 11.

In an embodiment, the electronic device 2 may not accurately capture a first bit of the bit stream illustrated in (a)

of FIG. 3 due to ambient noise when receiving the bit stream illustrated in (a) of FIG. 3 from the fuel cell system 1. In an alternative embodiment, the controller 13 may add a start bit string having a specific pattern, which indicates the start of transmission of the identification information of the fuel cell system 1, to the front of the bit string that indicates the identification information of the fuel cell system 1 to effectively capture the first bit of the bit stream. In one embodiment, for example, as illustrated in (b) of FIG. 3, the controller 13 may add a start bit string "10101010", which indicates the start of transmission of the identification information of the fuel cell system 1, to the front of the bit string that indicates the identification information of the fuel cell system 1. The start bit string may be stored in a register or memory of the controller 13 in advance. The controller 13 may read the start bit string stored in the register or memory of the controller 13, and may add the start bit string to the front of the bit string that indicates the identification information of the fuel cell system 1.

The controller 13 may encode the status information of the fuel cell system 1 by combining binary codes corresponding to status information of components of the fuel cell system 1 based on a predetermined order, for example, an order illustrated in (a) of FIG. 3. In such an embodiment, the controller 13 may encode the status information of the fuel cell system 1 by combining the binary codes corresponding to the status information of the components of the fuel cell system 1 in the order of a binary code corresponding to a remaining fuel capacity of the fuel storage 12, a binary code corresponding to the current temperature of the fuel cell 11, and a binary code corresponding to an output power of the fuel cell 11. The encoding may be performed based on a portion of the status information described above. In one embodiment, for example, the controller 13 may combine only the binary code corresponding to the remaining fuel capacity of the fuel storage 12 and the binary code corresponding to the current temperature of the fuel cell 11. Other status information may be added to the status information described above and then the encoding may be performed. In one embodiment, for example, when the fuel cell system 1 fails, the controller 13 may add a binary code corresponding to error information that indicates the cause of failure of the fuel cell system 1 to the binary codes and then may combine resultant binary codes.

In an embodiment, the controller 13 may convert the status information of the components of the fuel cell system 1 into binary values, and may determine the binary values as the binary codes corresponding to the status information of the components of the fuel cell system 1 to determine the binary codes. In one embodiment, for example, where one byte is assigned to represent temperature information of the fuel cell 11, when the current temperature of the fuel cell 11 is 30 degrees Celsius, the controller 13 converts the 30 degrees Celsius into a binary value "00011110". In such an embodiment, a value detected by a sensor may be accurately represented, while a length of a bit string for representing the value detected by the sensor may become longer when a resolving power of the sensor increases. In an alternative embodiment, to determine the binary codes, the controller 13 may extract binary codes mapped to sections, to which the status information of the components of the fuel cell system 1 belongs, from a table in which a plurality of sections, which are obtained by dividing the total range of a changeable status of each of the components of the fuel cell system 1, and a plurality of binary codes are mapped to each other in one-to-one correspondence, and may determine the extracted binary codes as binary codes corresponding to the status information of the components of the fuel cell system 1.

FIG. 4 is a diagram illustrating an embodiment of a mapping table of binary codes according to the invention. As illustrated in FIG. 4, when the total range of a sensed temperature of the fuel cell 11 is from 1 degree Celsius to 100 degrees Celsius, the total range may be divided into ten sections of 10 degrees Celsius, and four bits are assigned to each of the ten sections to represent the temperature information of the fuel cell 1. When the current temperature of the fuel cell 11 is 15 degrees Celsius, the controller 13 may extract a binary code "0001" mapped to a section "11~20", to which 15 degrees Celsius belongs, and may determine the binary code "0001" as a binary code corresponding to the current temperature of the fuel cell 11. In such an embodiment, a value detected by the sensor may not be represented to be mapped into binary codes in one-to-one correspondence, while a length of a bit string for representing the value detected by the sensor may be reduced using divided sections.

Referring back to FIG. 2, as shown in operation 104, the FC interface 16 of the fuel cell system 1 transmits the bit stream generated in operation 103 to the electronic device 2 through the serial communication line. In operation 207, the FC interface 27 of the electronic device 2 receives the bit stream, which includes the bit string that indicates the identification information of the fuel cell system 1 and the bit string that indicates the status information of the fuel cell system 1, from the fuel cell system 1 through the serial communication line.

In operation 208, the processor 21 of the electronic device 2 obtains the identification information of the fuel cell system 1 and the status information of the fuel cell system 1 from the bit stream received in operation 207. The processor 21 may obtain the identification information of the fuel cell system 1 by extracting a bit string having a predetermined length, which is first received in operation 207, as the identification information of the fuel cell system 1. In such an embodiment, the processor 21 may obtain the status information of the fuel cell system 1 by decoding a bit string that is received subsequent to the bit string having the predetermined length, that is, by decoding the bit string that indicates the status information of the fuel cell system 1. In one embodiment, for example, as illustrated in (a) of FIG. 3, the processor 21 of the electronic device 2 may obtain the identification information of the fuel cell system by extracting a bit string of two bytes that is first received in operation 207 as the identification information of the fuel cell system 1.

In an alternative embodiment, the processor 21 may monitor signals received from the fuel cell system 1, and when a start bit string of a specific pattern, which indicates the start of transmission of information of the fuel cell system 1, is detected during the monitoring, the processor 21 may obtain the identification information of the fuel cell system 1 by extracting a bit string having a predetermined length, which is received subsequent to the start bit string, as the identification information of the fuel cell system 1. In such an embodiment, the processor 21 may obtain the status information of the fuel cell system 1 by decoding a bit string that is received subsequent to the bit string having the predetermined length. In one embodiment, for example, as illustrated in (b) of FIG. 3, the processor 21 may monitor signals received from the fuel cell system 1, and when a start bit string "10101010", which indicates the start of the transmission of the identification information of the fuel cell system 1, is detected during the monitoring, the processor 21 may obtain the identification information of the fuel cell system 1 by extracting a bit string having two bytes, which is received subsequent to the start bit string, as the identification information of the fuel cell system 1.

The processor 21 may extract each of the binary codes corresponding to the status information of the components of the fuel cell system 1 according to a predetermined order from the bit string that indicates the status information of the fuel cell system 1, and may decode the bit string that indicates the status information of the fuel cell system 1 by determining status information corresponding to each of the binary codes. In one embodiment, for example, as illustrated in (a) of FIG. 3, the processor 21 may extract each of the binary codes corresponding to the status information of the components of the fuel cell system 1, according to an order of a remaining fuel capacity of the fuel storage 12, a temperature of the fuel cell 11, and an output power of the fuel cell 11, from the bit string that indicates the status information of the fuel cell system 1, and may decode the bit string that indicates the status information of the fuel cell system 1 by determining status information corresponding to each of the binary codes.

In an embodiment, the processor 21 may determine a binary value of each of the binary codes extracted as described above, as the status information of each of the components of the fuel cell system 1 to determine the status information. In one embodiment, for example, when one byte is assigned to represent a temperature of the fuel cell 11, the processor 21 may determine a binary code "00011110" corresponding to the current temperature of the fuel cell 11 as the status information of each of the components of the fuel cell system 1.

In an alternative embodiment, to determine the status information, the processor 21 may detect a section mapped to each of the binary codes extracted as described above from a table, in which a plurality of sections, which are obtained by dividing the total range of a changeable state of each of the components of the fuel cell system 1, and a plurality of binary codes are mapped to each other in one-to-one correspondence, and may determine a value that represents the detected section as the status information of each of the components of the fuel cell system 1. A value that represents a section may be a middle value of the section. In one embodiment, for example, the processor 21 may detect a section "11~20" mapped to a binary code "0001" corresponding to the current temperature of the fuel cell 11 from the binary code mapping table illustrated in FIG. 4, and may determine a value (e.g., 15 degrees Celsius) that represents the section "11~20" as the current temperature of the fuel cell 11.

In an embodiment, as shown in operation 209 of FIG. 2, the processor 21 of the electronic device 2 generates control information of the fuel cell system 1 based on the identification information of the fuel cell system 1 and the status information of the fuel cell system 1, which are obtained in operation 208. In one exemplary embodiment, for example, the control information of the fuel cell system 1 may include control information of various pumps such as a fuel pump, an air pump, and a water pump, which are included in the MBOP 14, and control information of a DC/DC converter, which is included in the EBOP 15. The processor 21 may determine specifications of the fuel cell system 1 from the identification information of the fuel cell system 1, and may generate the control information of the fuel cell system 1 based on the specifications of the fuel cell system 1 and the status information of the fuel cell system 1. In one embodiment, for example, the processor 21 may generate the control information of the various pumps, such as the fuel pump, the air pump, and the water pump, and the control information of the DC/DC converter, based on at least one of a rated power, a rated voltage and a rated current of the fuel cell 11. In such an embodiment, the processor 21 may generate the control information of the various pumps such that the amount of pumping of each pump increase as the rated power of the fuel cell 11 increases, and may generate the control information of the DC/DC converter such that an output voltage of the DC/DC converter increases as the rated voltage of the fuel cell 11 increases.

The processor 21 may generate the control information of the fuel cell system 1 based on the status information of the fuel cell system 1 by using an operational algorithm of the fuel cell system 1, which corresponds to the identification information of the fuel cell system 1. In one embodiment, for example, the processor 21 may determine a type of the fuel cell 11 from the identification information of the fuel cell system 21, and may generate the control information of the fuel cell system 1 using an operational algorithm corresponding to the type of the fuel cell 11, which may be selected from among various operational algorithms corresponding to various types of the fuel cell based on the type of the fuel cell 11. As described above, the fuel cell 11 may be one of various types of fuel cell including a solid oxide fuel cell, a polymer electrolyte fuel cell and a DMFC, for example, and different operational algorithms are applied to different types of fuel cell. In an embodiment, where the fuel cell 11 is the DMFC, the processor 21 of the electronic device 2 may generate the control information of the fuel cell system 1 using an operational algorithm of the DMFC. In an embodiment, where the fuel cell 11 is the DMFC, the process of reforming methanol, which may be performed in other types of fuel cell, is omitted in the operational algorithm of the DMFC.

In an embodiment, the processor 21 may determine the environment of the fuel cell system 1 based on environment information of a region, at which the electronic device 2 is located, and may generate the control information of the fuel cell system 1 using an algorithm corresponding to the environment of the fuel cell system 1, which may be selected from among various operational algorithms corresponding to various environments based on the environment of the fuel cell system 1. The environment information of the region, at which the electronic device 2 is located, may be received from a server located in a network through the communication interface 24 of the electronic device 2. In an embodiment, the environment information of the region at which the electronic device 2 is located may include a temperature and humidity of the region, for example. In one embodiment, for example, a high temperature operational algorithm, a normal temperature operational algorithm, or a low temperature operational algorithm is applied according to the ambient temperature of the fuel cell system 1. When the ambient temperature of the fuel cell system 1 is substantially low, the processor 21 of the electronic device 2 may generate the control information of the fuel cell system 1 using the low temperature operational algorithm. In an embodiment, when the ambient temperature of the fuel cell system 1 is low, the processor 21 may generate control information of various kinds of pumps to increase the density of a fuel flowing into the fuel cell 11 and to raise the temperature of the fuel cell 11. When the fuel cell 11 is the DMFC and the ambient temperature of the fuel cell system 1 is substantially low, the processor 21 may generate the control information of the fuel cell system 1 using a low temperature operational algorithm of the DMFC.

In an embodiment, the processor 21 may select any one of various operational modes of the fuel cell system 1 based on the status information of the fuel cell system 1, and may generate the control information of the fuel cell system 1 based on a selected operational mode. In an embodiment, the operational modes may include a start-up mode for starting up the fuel cell 11 and a normal mode in which power is supplied from the fuel cell system 1 to the electronic device 2, for example. In such an embodiment, when the start-up mode is selected, the processor 21 generates the control information of the various kinds of pumps with reference to the amount of supply of a fuel and air for warming up the fuel cell 11. In such an embodiment, when the normal mode is selected, the processor 21 generates the control information of the various kinds of pumps and the control information of the DC/DC converter such that power to be supplied to the electronic device 2 may be produced by the fuel cell 11. The power to be supplied to the electronic device 2 may be power for charging the battery 26. When power is also supplied to a load of the electronic device 2 while charging the battery 26, the sum of power for charging the battery 26 and power for the load of the electronic device 2 may be supplied to the electronic device 2.

In such an embodiment, the processor 21 may calculate a value that indicates other status information of the fuel cell system 1 from a value that indicates status information of at least one of the components of the fuel cell system 1, and may generate the control information of the fuel cell system 1 based on an original status information and the additionally calculated status information. In one embodiment, for example, the processor 21 may calculate a difference between a target temperature of the fuel cell 11 and the current temperature of the fuel cell 1, may calculate a difference between a target output of the fuel cell 11 and the current output the fuel cell 11, and may estimate a difference between a target density of a fuel and the current density of the fuel from the calculated differences. The estimation of the density of a fuel is described in detail in Korean patent application Pub. No, 10-2011-0002339.

In an embodiment, as shown in operation 210 of FIG. 2, the processor 21 of the electronic device 2 generates a bit stream including the bit string that indicates the control information of the fuel cell system 1, which is generated in operation 209. In operation 210, the processor 21 of the electronic device 2 may generate a bit string that indicates the control information of the fuel cell system 1 by encoding the control information of the fuel cell system 1, which is generated in operation 209, and may generate a bit stream including the bit string.

Figure 5:
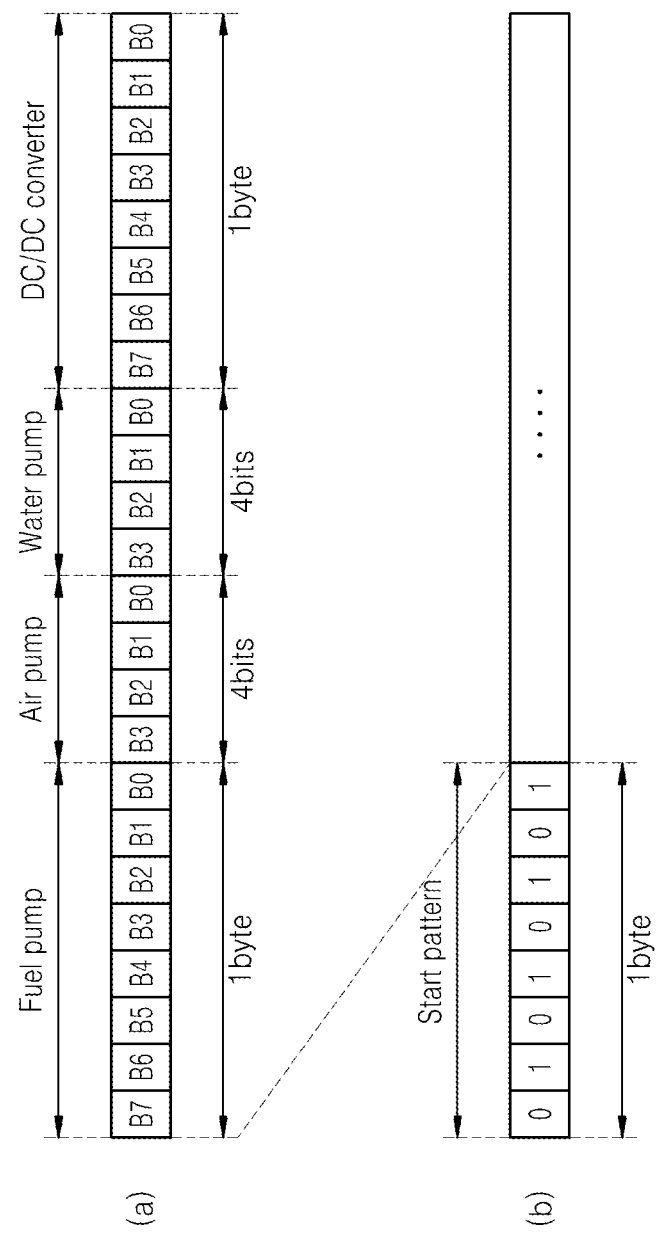
FIG. 5 is a diagram illustrating a format of an embodiment of a bit stream that is transmitted by an electronic device according to the invention.

FIG. 5 is a diagram illustrating a format of another embodiment of a bit stream that is transmitted by the electronic device 2 according to the invention. Referring to (a) of FIG. 5, a bit string that indicates control information of the fuel cell system 1 includes four bits that indicates control information of a fuel pump, four bits that indicates control information of an air pump, four bits that indicates control information of a water pump, and one byte that indicates control information of a DC/DC converter. In such an embodiment, one byte is assigned to the control information of the DC/DC converter as a large number of bits are required to represent the control information of the DC/DC converter that is included in the EBOP 15 when compared to the fuel pump, the air pump and the water pump, which are included in the MBOP 14. The bit string that indicates the control information of the fuel cell system 1 may further include a bit string that indicates additional information other than the information described above. In one embodiment, for example, the bit string that indicates the control information of the fuel cell system 1 may further include a bit string that indicates control information of a fan provided to, e.g., attached on, the fuel cell 11 to cool the fuel cell 11.

The fuel cell system 1 may not accurately capture a first bit of the bit stream illustrated in (a) of FIG. 5 due to ambient noise when receiving the bit stream illustrated in (a) of FIG. 5 from the electronic device 2. Accordingly, in an alternative embodiment, the processor 21 may add a start bit string having a specific pattern, which indicates the start of transmission of the control information of the fuel cell system 1, to the front of the bit string that indicates the control information of the fuel cell system 1. In one embodiment, for example, as illustrated in (b) of FIG. 5, the processor 21 may add a start bit string "01010101", which indicates the start of transmission of the control information of the fuel cell system 1, to the front of the bit string that indicates the control information of the fuel cell system 1. The start bit string may be stored in a register or memory of the processor 21 in advance. The processor 21 may read the start bit string stored in the register or memory of the processor 21, and may add the start bit string to the front of the bit string that indicates the control information of the fuel cell system 1.

The processor 21 may encode the control information of the fuel cell system 1 by combining binary codes corresponding to control information of components of the fuel cell system 1 based on a predetermined order, for example, an order illustrated in (a) of FIG. 5. In such an embodiment, the processor 21 may encode the control information of the fuel cell system 1 by combining the binary codes corresponding to the control information of the components of the fuel cell system 1 in the order of a binary code corresponding to the control information of the fuel pump, a binary code corresponding to the control information of the air pump, a binary code corresponding to the control information of the water pump, and a binary code corresponding to the control information of the DC/DC converter. In an alternative embodiment, the encoding may be performed based on a portion of the control information described above. In one embodiment, for example, the processor 21 may combine only the binary code corresponding to the control information of the fuel pump and the binary code corresponding to the control information of the DC/DC converter. In an alternative embodiment, other control information may be added to the control information described above and then the encoding may be performed. In one embodiment, for example, the processor 21 may add a binary code corresponding to the control information of the fan, which is attached on the fuel cell 11 to adjust the temperature of the fuel cell 11, to the binary codes and then may combine resultant binary codes.

In an embodiment, to determine the binary codes in a decoding process, the processor 21 may convert the control information of the components of the fuel cell system 1 into binary values, and may determine the binary values as the binary codes corresponding to the control information of the components of the fuel cell system 1. In an alternative embodiment, to determine the binary codes in a decoding process, the processor 21 may extract binary codes mapped into sections, which correspond to the control information of the components of the fuel cell system 1, from a table, in which a plurality of sections, which are obtained by dividing the total range of an applicable control of each of the components of the fuel cell system 1, and a plurality of binary codes are mapped to each other in one-to-one correspondence, and may determine the extracted binary codes as binary codes corresponding to the control information of the components of the fuel cell system 1.

In an embodiment as shown in operation 211 of FIG. 2, the FC interface 27 of the electronic device 2 transmits the bit stream generated in operation 210 to the fuel cell system 1 through a serial communication line. In an embodiment, as shown in operation 105 of FIG. 2, the FC interface 16 of the fuel cell system 1 receives the bit stream including the bit string that indicates the control information of the fuel cell system 1 through the serial communication line.

In an embodiment, as shown in operation 106 of FIG. 2, the controller 13 of the fuel cell system 1 obtains the control information from the bit stream received in operation 105. The controller 13 may obtain the control information of the fuel cell system 1 by decoding the bit string that indicates the control information of the fuel cell system 1, which is included in the bit stream received in operation 105. The controller 13 may obtain the control information of the fuel cell system 1 by decoding a bit string having a predetermined length, which is first received in operation 105. In one embodiment, for example, as illustrated in (a) of FIG. 5, the controller 13 may obtain the control information of the fuel cell system 1 by decoding a bit string of three bytes, which is first received in operation 207.

In an alternative embodiment, the controller 13 may monitor signals received from the fuel cell system 1, and when a start bit string of a specific pattern, which indicates the start of transmission of information of the fuel cell system 1, is detected during the monitoring, the controller 13 may obtain the control information of the fuel cell system 1 by decoding a bit string having a predetermined length, which is received subsequent to the start bit string. In one embodiment, for example, as illustrated in (b) of FIG. 5, the controller 13 may monitor signals received from the fuel cell system 1, and when a start bit string "01010101", which indicates the start of the transmission of the control information of the fuel cell system 1, is detected during the monitoring, the controller 13 may obtain the control information of the fuel cell system 1 by decoding a bit string having three bytes, which is received subsequent to the start bit string.

The controller 13 may extract each of the binary codes corresponding to the control information of the components of the fuel cell system 1 based on a predetermined order from the bit string that indicates the control information of the fuel cell system 1, and may decode the bit string that indicates the control information of the fuel cell system 1 by determining control information corresponding to each of the binary codes. In one embodiment, for example, as illustrated in (a) of FIG. 5, the controller 13 may extract each of the binary codes corresponding to the control information of the components of the fuel cell system 1, in the order of the control information of the fuel pump, the control information of the air pump, the control information of the water pump and the control information of the DC/DC converter, from the bit string that indicates the control information of the fuel cell system 1, and may decode the bit string that indicates the control information of the fuel cell system 1 by determining control information corresponding to each of the binary codes.

In an embodiment, to determine the binary code in the decoding process, the controller 13 may determine a binary value of each of the binary codes extracted as described above, as the control information of each of the components of the fuel cell system 1. In an alternative embodiment, to determine the binary code in the decoding process, the controller 13 may detect a section mapped to each of the binary codes extracted as described above from a table in which a plurality of sections, which are obtained by dividing the total range of an applicable control of each of the components of the fuel cell system 1, and a plurality of binary codes are mapped to each other in one-to-one correspondence, and may determine a value that represents the detected section as the control information of each of the components of the fuel cell system 1.

In an embodiment, as shown in operation 107 of FIG. 2, the controller 13 of the fuel cell system 1 controls the power production of the fuel cell 11 by controlling operations of peripheral devices of the fuel cell system 1 based on the control information of the fuel cell system 1, which is obtained in operation 106. In one embodiment, for example, when the controller 13 receives the bit stream illustrated in (a) of FIG. 5, the controller 13 may control the power production of the fuel cell 11 to produce power to be supplied to the electronic device 2, by controlling the fuel pump based on the control information of the fuel pump, controlling the air pump based on the control information of the air pump, controlling the water pump based on the control information of the water pump, and controlling the DC/DC converter based on the control information of the DC/DC converter.

In an embodiment, as shown in operation 108 of FIG. 2, the controller 13 of the fuel cell system 1 determines whether the fuel cell system 1 is separated from the electronic device 2. When it is determined that the fuel cell system 1 is separated from the electronic device 2, an end mode is performed. When it is determined that the fuel cell system 1 is not separated from the electronic device 2, operation 102 is performed again. The controller 13 may determine whether the fuel cell system 1 is separated from the electronic device 2, based on a signal that is generated by a mechanical coupling of the FC interface 16 of the fuel cell system 1 and the FC interface 27 of the electronic device 2. In one embodiment, for example, a switch that is operated when the FC interface 16 of the fuel cell system 1 and the FC interface 27 of the electronic device 2 are separated from each other by a user may be provided in the FC interface 16 of the fuel cell system 1, and the controller 13 may determine whether the fuel cell system 1 has been separated from the electronic device 2, based on a signal of the switch, e.g., a switch-on signal or a switch-off signal.

In the end mode, the controller 13 of the fuel cell system 1 controls the peripheral device of the fuel cell 11 to smoothly finish the power production of the fuel cell 11 without damaging the fuel cell system 1 and the electronic device 2. The controller 13 may proceed to the end mode when status information of the fuel storage 12 indicates that a remaining fuel capacity of the fuel storage 12 is approximately a limit capacity, as well as when the fuel cell system 1 has been separated from the electronic device 2. In the case where operation 102 is performed again after operation 108, the controller 13 obtains the status information of the components of the fuel cell system 1. A portion of the status information of the components of the fuel cell system 11 may not be substantially changed such that the portion of the status information of the components the fuel cell system 11 may not be provided to the electronic device 2 again. The controller 13 may provide the identification information of the fuel cell system 1 to the electronic device 2 again, but the controller 13 does not have to certainly provide the identification information of the fuel cell system 1 to the electronic device 2 since the identification information of the fuel cell system 1 has already been provided to the electronic device 2.

Figure 6A:
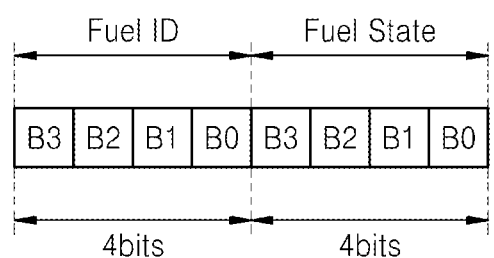
FIGS. 6A and 6B are diagrams each illustrating a format of another embodiment of a bit stream according to the invention.
Figure 6B:
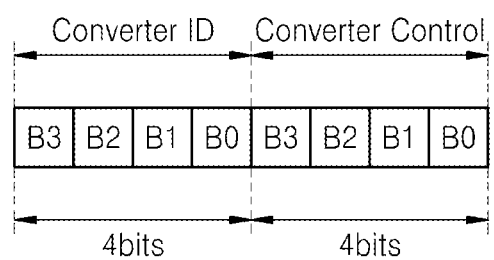

FIGS. 6A and 6B are diagrams each illustrating a format of an alternative embodiment of a bit stream according to the invention.

In an embodiment, when operations 103 and 104 are repeatedly performed, as illustrated in FIG. 6A, the controller 13 may generate and transmit only a bit string that indicates identification information of a portion of the status information of the components of the fuel cell system 1 and a bit string that indicates the portion of the status information of the components of the fuel cell system 1, as the identification information of the portion of the status information of the components of the fuel cell system 1 may not be provided to the electronic device 2 again. In one embodiment, for example, as illustrated in FIG. 6A, the controller 13 may transmit a bit stream that includes a bit string that indicates identification information of a remaining fuel capacity and a bit string that indicates state information of the remaining fuel capacity.

In an embodiment, when some of the previously received control information of the components of the fuel cell system 11 may be unchanged, e.g., when operations 210 and 211 that are repeatedly performed, such information may not be provided to the fuel cell system 1 again such that the controller 13 may generate and transmit only a bit string that indicates identification information of some of the control information of the components of the fuel cell system 1 and a bit string that indicates the some of the control information. In one embodiment, for example, as illustrated in FIG. 6B, the controller 13 may transmit a bit stream that includes a bit string that indicates identification information of some of the control information of the DC/DC converter and a bit string that indicates the some of the control information of the DC/DC converter.

Figure 7A:
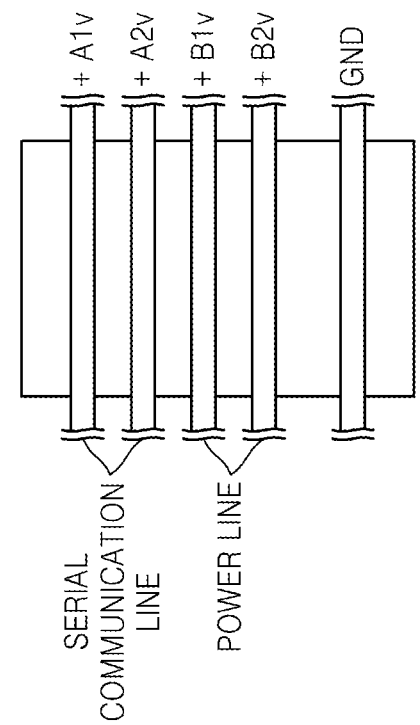
FIGS. 7A through 7D are diagrams illustrating embodiments of a power line and serial communication line illustrated in FIG. 1.
Figure 7B:
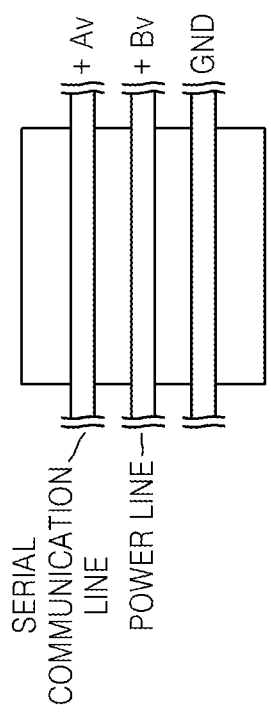

FIGS. 7A through 7D are diagrams illustrating embodiments of a power line and serial communication line illustrated in FIG. 1. Referring to FIGS. 7A and 7B, the FC interface 16 of the fuel cell system 1 may receive power from the electronic device 2 or may supply power to the electronic device 2 through a power line different from the serial communication line. In response, the FC interface 27 of the electronic device 2 may receive power from the fuel cell system 1 or may supply power to the fuel cell system 1 through the power line. In one embodiment, as illustrated in FIG. 7A, a signal, which is provided from the fuel cell system 1 to the electronic device 2, and a signal, which is provided from the electronic device 2 to the fuel cell system 1, may be exchanged through a single line. In such an embodiment, the signal, which is provided from the fuel cell system 1 to the electronic device 2, and the signal, which is provided from the electronic device 2 to the fuel cell system 1, are in the range of about zero (0) volt (e.g., a ground voltage GND) to +A volts, where A is a real number greater than zero (0). In such an embodiment, power, which is provided from the fuel cell system 1 to the electronic device 2, and power, which is provided from the electronic device 2 to the fuel cell system 1, may be exchanged through a single line. In such an embodiment, the power, which is provided from the fuel cell system 1 to the electronic device 2, and the power, which is provided from the electronic device 2 to the fuel cell system 1, are in the range of about zero (0) volt to +B volts, where B is a real number greater than zero (0).

In an alternative embodiment, as illustrated in FIG. 7B, the signal, which is provided from the fuel cell system 1 to the electronic device 2, and the signal, which is provided from the electronic device 2 to the fuel cell system 1, may be exchanged through separate lines. In such an embodiment, the signal, which is provided from the fuel cell system 1 to the electronic device 2, is in the range of about zero (0) volts to +A1 volts, where A1 is a real number greater than zero (0), and the signal, which is provided from the electronic device 2 to the fuel cell system 1, is in the range of about zero (0) volt to +A2 volts, where A2 is a real number greater than zero (0). In such an embodiment, A1 and A2 may be substantially the same as each other or different from each other. In such an embodiment, the power, which is provided from the fuel cell system 1 to the electronic device 2, and the power, which is provided from the electronic device 2 to the fuel cell system 1, may be exchanged through separate lines. In such an embodiment, the power, which is provided from the fuel cell system 1 to the electronic device 2 is in the range of about zero (0) volt to +B1 volts, where B1 is a real number greater than zero (0), and the power, which is provided from the electronic device 2 to the fuel cell system 1, is in the range of about zero (0) volt to +B2 volts, where B2 is a real number greater than zero (0). B1 and B2 may be substantially the same as or different from each other.

Figure 7C:
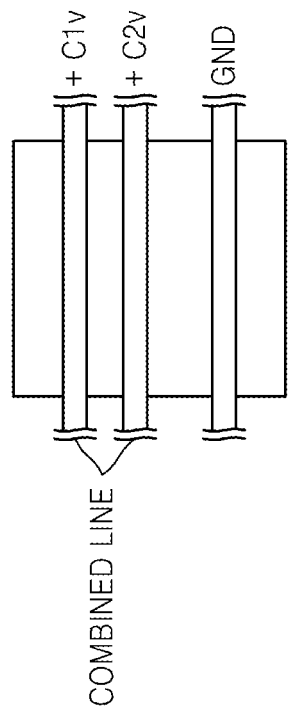
Figure 7D:
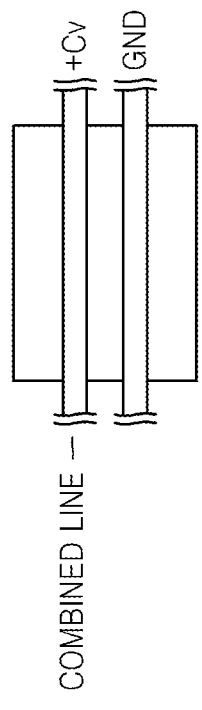

Referring to FIGS. 7C and 7D, in another embodiment, the FC interface 16 of the fuel cell system 1 may receive power from the electronic device 2, or may supply power to the electronic device 2, through the serial communication line. In such an embodiment, the fuel cell system 1 and the electronic device 2 may exchange both a signal and power through a single line in which the serial communication line and the power line are combined. In one embodiment, for example, the fuel cell system 1 may supply power to the electronic device 2 by transmitting successive bits corresponding to maximum transmissible voltage values (namely, logic "1") of a signal to the electronic device 2 after the bit stream illustrated in FIG. 3. In an embodiment, a section, in which a current flow is cut off, that is, a section of logic "0", may exist in the bit stream illustrated in FIG. 3. In such an embodiment, the fuel cell system 1 may supply power to the electronic device 2 using bits corresponding to logic "1" from among bits of the bit stream illustrated in FIG. 3.

In response, the FC interface 27 of the electronic device 2 may receive power from the fuel cell system 1, or may supply power to the fuel cell system 1, through the serial communication line. In one embodiment, for example, the electronic device 2 may supply power to the electronic device 2 by transmitting successive bits corresponding to maximum transmissible voltage values (e.g., logic "1") of a signal to the fuel cell system 1 after the bit stream illustrated in FIG. 5. In an embodiment, a section, in which a current flow is cut off, that is, a section of logic "0", may exist in the bit stream illustrated in FIG. 5. In such an embodiment, the electronic device 2 may supply power to the fuel cell system 1 using bits corresponding to logic "1" from among bits of the bit stream illustrated in FIG. 5.

In one embodiment, as illustrated in FIG. 7C, a signal and power, which are provided from the fuel cell system 1 to the electronic device 2, and a signal and power, which are provided from the electronic device 2 to the fuel cell system 1, may be exchanged through a single line. In such an embodiment, the signal and power, which are provided from the fuel cell system 1 to the electronic device 2, and the signal and power, which are provided from the electronic device 2 to the fuel cell system 1, are in the range of about zero (0) volt to +C volts, where C is a real number greater than zero (0). In another embodiment, as illustrated in FIG.

7D, the signal and power, which are provided from the fuel cell system 1 to the electronic device 2, and the signal and power, which are provided from the electronic device 2 to the fuel cell system 1, may be exchanged through separate lines. In such an embodiment, the signal and power, which are provided from the fuel cell system 1 to the electronic device 2, are in the range of about zero (0) volt to +C1 volts, where C1 is a real number greater than zero (0), and the signal and power, which are provided from the electronic device 2 to the fuel cell system 1, are in the range of about zero (0) volt to +C2 volts, where C2 is a real number greater than zero (0). C1 and C2 may be substantially the same as or different from each other. In an embodiment, values of C, C1 and C2 may be about 5. In such an embodiment, when an output voltage of the fuel cell 11 is not about 5 volts, the EBOP 15 may change the output voltage of the fuel cell 11 to about 5 volts.

Figure 8:
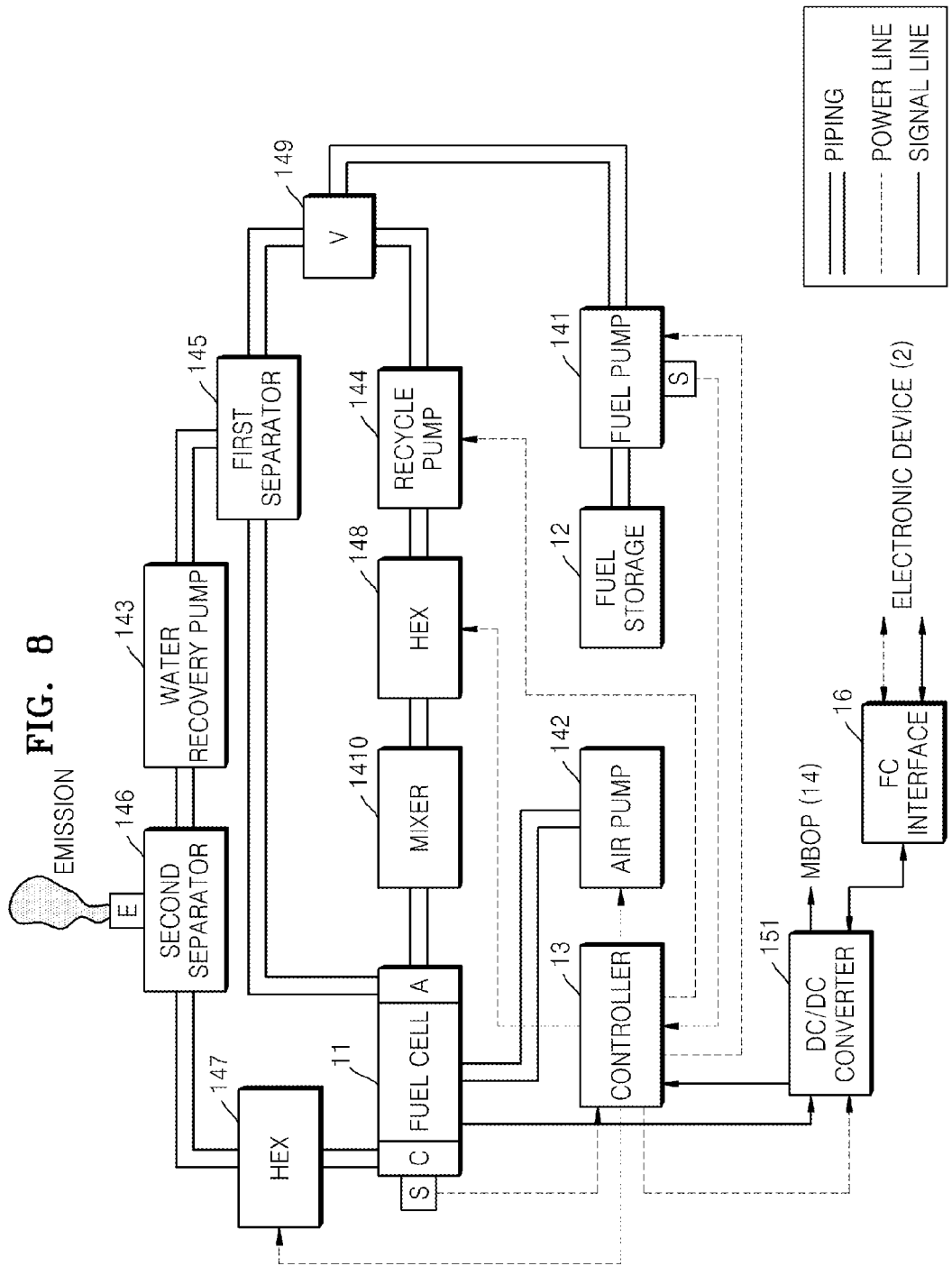
FIG. 8 is a block diagram illustrating an embodiment of the fuel cell system illustrated in FIG. 1.

FIG. 8 is a diagram illustrating an embodiment of the fuel cell system 1 illustrated in FIG. 1. Referring to FIG. 8, an embodiment of the fuel cell system 1 may include a fuel cell 11, a fuel storage 12, a controller 13, a fuel pump 141, an air pump 142, a water recovery pump 143, a recycle pump 144, a first separator 145, a second separator 146, a first heat exchanger (also referred to as "HEX") 147, a second heat exchanger 148, a valve module (also referred to as V) 149, a mixer 1410, a DC/DC converter 151, and an FC interface 16. In an embodiment, as shown in FIG. 8, sensors are disposed, e.g., mounted, in the fuel cell 11 and the fuel pump 141, but not being limited thereto. In an alternative embodiment, sensors may be additionally provided, e.g., mounted, in other components. The fuel pump 141, the air pump 142, the water recovery pump 143, the recycle pump 144, the first separator 145, the second separator 146, the first heat exchanger 147, the second heat exchanger 148, the valve module 149 and the mixer 1410 are included in the MBOP 14, and the DC/DC converter 151 is included in the EBOP 15. In an embodiment, as shown in FIG. 8, the fuel cell system 1 may be a fuel cell system, to which an MBOP for operating a DMFC has been applied. The fuel cell system 1 illustrated in FIG. 1 is substantially the same as the fuel cell system 1 illustrated in FIG. 8, and thus any repetitive detailed description will now be simplified or omitted.

In an embodiment, suitable amounts of methanol, water and air are supplied to the fuel cell 11 such that the reaction in the fuel cell 11 is substantially smoothly performed while effectively preventing deterioration of the fuel cell 11. The suitable amounts of methanol, water and air may be predetermined based on the characteristics of the fuel cell system 1. The controller 13 controls the fuel pump 141, the air pump 142, the recycle pump 144 and the water recovery pump 143 to adjust the amounts of fuel, water and air supplied to the fuel cell 11. The fuel cell 11 generates power using a fuel of a suitable concentration supplied from the mixer 1410 via the inlet at an anode A of the fuel cell 11. During power generation of the fuel cell 11, a by-product of the reaction, e.g., carbon dioxide, and unreacted fuel are discharged via an outlet at the anode A of the fuel cell 11, and a by-product of the reaction, e.g., water, is discharged via an outlet at a cathode C of the fuel cell 11.

The first separator 145 recovers methanol and water by separating the methanol and the water from the by-products and unreacted fuel that are discharged via the outlet at the anode A of the fuel cell 11. The by-product discharged via the outlet at the cathode C of the fuel cell 11 is a fluid heated by the reaction heat at the fuel cell 11 and contains water in the form of vapors. As the fluid passes through the first heat exchanger 147, the fluid is cooled via a heat exchange process of the first heat exchanger 147, where water is partially recovered. The second separator 146 recovers water by separating the water from the cooled by-product and discharges the remaining by-product after the recovery, e.g., carbon dioxide, to the outside. The first separator 145 and the second separator 146 may separate methanol and water from the by-products and unreacted fuel, which are discharged from the fuel cell 11, via centrifugal separation, for example. The water recovery pump 143 sucks water received by the second separator 146 and discharges the water to the first separator 145. Accordingly, the first separator 145 discharges a fuel having low concentration, in which methanol recovered by the first separator 145 and water recovered by the first and second separators 145 and 146 are mixed.

The valve module 149 is provided in, e.g., inserted to, a location at which a fuel circulation line and a fuel supply line are connected to each other, and controls flow of a low concentration fuel that circulates from the fuel cell 11 to the fuel cell 11 via the fuel circulation line and flow of a high concentration fuel supplied from the fuel storage 12 to the fuel cell 11 via the fuel supply line. In an embodiment, the fuel circulation line indicates pipes at a path, in which unreacted fuel discharged from the fuel cell 11 flows back to the fuel cell 11, and the fuel supply line indicates pipes at a path, in which a new fuel supplied from the fuel storage 12 to the fuel cell 11 flows.

According to fuel flow control of the valve module 149, the recycle pump 144 sucks at least one of a low concentration fuel transported via the fuel circulation line and a high concentration fuel transported via the fuel supply line from the valve module 149, and discharges the sucked fuel to the mixer 1410 via the second heat exchanger 148. As described above, the recycle pump 144 operates, e.g., pumps, to circulate a fuel in a predetermined path inside the fuel cell system, that is, peripheral devices other than the fuel storage 12 and the fuel pump 141 on the fuel supply line, the fuel cell 11 and pipes that interconnects the peripheral devices other than the fuel storage 12 and the fuel pump 141 on the fuel supply line, and the fuel cell 11. When a fuel discharged by the recycle pump 144 passes through the second heat exchanger 148, a temperature of the fuel is adjusted via a heat exchange process of the second heat exchanger 148. The mixer 1410 mixes a low concentration fuel and a high concentration fuel, which are discharged by the recycle pump 144, and provides a fuel at a suitable concentration formed via the mixing process to the fuel cell 11.

The first heat exchanger 147 is provided at a predetermined location of a pipe line, in which water discharged from the fuel cell 11 flows, e.g., the outlet of the cathode C of the fuel cell 11, and controls a temperature of the water discharged via the outlet of the cathode C of the fuel cell 11. The second heat exchanger 148 is provided at a predetermined location of a pipe line in which fuel supplied to the fuel cell 11 flows, e.g., a location between the recycle pump 144 and the mixer 1410, and controls a temperature of fuel supplied via the inlet of the anode A of the fuel cell 11.

The DC/DC converter 151 converts an output voltage of the fuel cell 11 to a voltage according to control of the controller 13, and supplies power having the converted voltage to at least one of the devices in the MBOP 14 and the FC interface 16 according to the control of the controller 13. Power supplied to the FC interface 16 is transmitted to the electronic device 2. As described above, all control such as, control of various kinds of pumps and control of the DC/DC converter 151, for example, are performed based on the control information of the fuel cell system 1, which is obtained from a bit stream transmitted from the electronic device 2.

According to an embodiment, as described above, communication between the fuel cell system 1 and the electronic device 2 may be effectively implemented with a general-purpose serial communication method by transmitting and receiving a bit stream, which includes a bit string that indicates identification information of the fuel cell system 1 and a bit string that indicates status information of the fuel cell system 1, through a serial communication line and transmitting and receiving a bit stream including a bit string that indicates control information of the fuel cell system 1 through the serial communication line. In such an embodiment, by using encoding and decoding forms of the status information of the fuel cell system 1 and encoding and decoding forms of the control information of the fuel cell system 1, which are not changed based on the type and the model of the fuel cell system 1, the status information and control information of the fuel cell system 1 may be exchanged between the fuel cell system 1 and the electronic device 2 regardless of types and models of the fuel cell system 1 and the electronic device 2. In such an embodiment, the fuel cell system 1 may not perform various data processes and operations for generating the control information of the fuel cell system 1, such that the fuel cell system 1 may be implemented with a low performance processor, and thus, the cost of manufacturing the fuel cell system 1 may be substantially reduced.

It should be understood that the embodiments described therein should be considered in a descriptive sense only and not for purposes of limitation. Descriptions of features or aspects within each embodiment should typically be considered as available for other similar features or aspects in other embodiments.

What is claimed is:

1. A method of operating a fuel cell system which is controlled by an electronic device, the method comprising:
    generating a bit stream comprising a bit string which indicates identification information of the fuel cell system and a bit string which indicates status information of the fuel cell system by generating the bit string which indicates the status information by encoding the status information of the fuel cell system and then adding the bit string which indicates the status information after the bit string which indicates the identification information;
    transmitting the bit stream to the electronic device through a serial communication line;
    receiving a bit stream comprising a bit string which indicates control information of the fuel cell system from the electronic device through the serial communication line;
    obtaining the control information of the fuel cell system from the received bit stream; and
    controlling power production of a fuel cell of the fuel cell system by controlling operations of peripheral devices of the fuel cell system based on the obtained control information of the fuel cell system,
    wherein the generating the bit stream comprises:
        extracting a plurality of binary codes, which are mapped into a plurality of sections, from a predetermined table; and
        encoding the status information of the fuel cell system by combining the extracted binary codes corresponding to status information of components of the fuel cell system based on a predetermined order,
    wherein the sections correspond to the status information of a component of the fuel cell system, and
    the sections, which are obtained by dividing a total range of a changeable status of the component of the fuel cell system, and the binary codes are mapped to each other in one-to-one correspondence in the predetermined table.

2. The method of claim 1, wherein the generating the bit stream further comprises converting the status information of the components of the fuel cell system into binary values, and determining the converted binary values as the binary codes corresponding to status information.

3. The method of claim 1, wherein the generating the bit stream comprises generating the bit stream by adding a start bit string having a predetermined pattern, which indicates the start of transmission of the identification information of the fuel cell system, before the bit string which indicates the identification information.

4. The method of claim 1, further comprising:
    transmitting a bit stream including a bit string which indicates a portion of the identification information of the fuel cell system and a bit string which indicates a portion of the status information of the fuel cell system.

5. A fuel cell system which is controlled by an electronic device, the fuel cell system comprising:
    a fuel cell which produces power using a fuel;
    a balance of plants which supplies the fuel to the fuel cell;
    a controller which generates a bit string which indicates status information of the fuel cell system by encoding the status information, and controls a power production of the fuel cell by controlling an operation of the balance of plants based on control information of the fuel cell system; and
    an interface which transmits a bit stream comprising the generated bit string to the electronic device and a bit string which indicates identification information of the fuel cell system through a serial communication line, and receives a bit stream comprising a bit string which indicates the control information of the fuel cell system from the electronic device through the serial communication line,
    wherein the interface receives power from the electronic device or supplies power to the electronic device, through the serial communication line and
    the interface supplies power to the electronic device by transmitting successive bits corresponding to maximum transmissible voltage values of a signal to the electronic device after the transmitted bit stream.

6. The fuel cell system of claim 5, wherein the controller generates the bit stream, which is transmitted to the electronic device, by adding the bit string which indicates the status information of the fuel cell system after the bit string which indicates the identification information of the fuel cell system.

7. The fuel cell system of claim 5, wherein the interface receives power from the electronic device or supplies power to the electronic device, through a power line, which is different from the serial communication line.

8. A method of controlling a fuel cell system using an electronic device, the method comprising:
    receiving a bit stream including a bit string which indicates identification information of the fuel cell system and a bit string which indicates status information of the fuel cell system from the fuel cell system through a serial communication line;
    obtaining the identification information of the fuel cell system and the status information of the fuel cell system from the received bit stream by decoding the bit string which indicates the status information of the fuel cell system, which is received after the bit string which indicates the identification information of the fuel cell system;
generating control information of the fuel cell system based on the obtained identification information of the fuel cell system and the obtained status information of the fuel cell system;
generating a bit stream including a bit string which indicates the control information of the fuel cell system; and
transmitting the generated bit stream to the fuel cell system through the serial communication line,
wherein the obtaining the identification information of the fuel cell system and the status information of the fuel cell system comprises extracting each of binary codes corresponding to status information of components of the fuel cell system based on a predetermined order from the bit string which indicates the status information of the fuel cell system, and decoding the bit string which indicates the status information of the fuel cell system by determining status information corresponding to each of the binary codes,
wherein the obtaining the identification information of the fuel cell system and the status information of the fuel cell system further comprises:
detecting a section mapped to each of the extracted binary codes from a table, in which a plurality of sections, which are obtained by dividing a total range of a changeable status of each of the components of the fuel cell system, and a plurality of binary codes are mapped to each other in one-to-one correspondence; and
determining a value which represents the detected section as the status information of each of the components of the fuel cell system.

9. The method of claim 8, wherein the obtaining the identification information of the fuel cell system and the status information of the fuel cell system further comprises determining a binary value of each of the extracted binary codes as the status information of each of the components of the fuel cell system.

10. The method of claim 8, wherein the obtaining the identification information of the fuel cell system and the status information of the fuel cell system further comprises obtaining the identification information by extracting a bit string having a predetermined length, which is first received from the fuel cell system, as the identification information, and obtaining the status information by decoding a bit string that is received subsequent to the bit string having the predetermined length.

11. The method of claim 8, wherein the obtaining the identification information of the fuel cell system and the status information of the fuel cell system further comprises:
monitoring signals received from the fuel cell system;
obtaining the identification information by extracting a bit string having a predetermined length, which is received after a start bit string of a predetermined pattern, as the identification information when the start bit string of the predetermined pattern, which indicates the start of transmission of information of the fuel cell system, is detected during the monitoring; and
obtaining the status information by decoding a bit string which is received after the bit string having the predetermined length.

12. The method of claim 8, further comprising:
transmitting a bit stream including a bit string which indicates a portion of the identification information of the fuel cell system and a bit string which indicates a portion of the control information of the fuel cell system.

13. The method of claim 8, wherein the generating the control information comprises:
determining specifications of the fuel cell system from the identification information of the fuel cell system; and
generating the control information of the fuel cell system based on the specifications of the fuel cell system and the status information of the fuel cell system.

14. The method of claim 8, wherein the generating the control information of the fuel cell system comprises generating the control information of the fuel cell system based on the status information of the fuel cell system using an operational algorithm of the fuel cell system, which corresponds to the identification information of the fuel cell system.

15. The method of claim 14, wherein the generating the control information of the fuel cell system further comprises:
determining a type of a fuel cell of the fuel cell system from the identification information of the fuel cell system; and
generating the control information of the fuel cell system using an operational algorithm corresponding to the type of the fuel cell, which is selected from among various operational algorithms corresponding to various types of the fuel cell based on the type of the fuel cell.

16. The method of claim 8, wherein the generating the control information of the fuel cell system comprises:
determining an environment of the fuel cell system based on environment information of a region, at which the electronic device is located; and
generating the control information of the fuel cell system using an algorithm corresponding to the environment of the fuel cell system, which is selected from among various operational algorithms corresponding to various environments based on the determined environment of the fuel cell system.

17. The method of claim 8, wherein the generating the control information of the fuel cell system comprises:
selecting one of a plurality of operational modes comprising a start-up mode for starting up a fuel cell of the fuel cell system and a normal mode in which power is supplied from the fuel cell system to the electronic device, based on the status information of the fuel cell system; and
generating the control information of the fuel cell system based on a selected operational mode.

18. The method of claim 8, wherein the generating the control information of the fuel cell system comprises:
calculating a value which indicates additional status information of the fuel cell system from a value which indicates status information of a component of the fuel cell system; and
generating the control information of the fuel cell system based on the status information of the component and the additional status information.

19. An electronic device for controlling a fuel cell system, the electronic device comprising:
a processor which generates control information of the fuel cell system based on status information of the fuel cell system and generates a bit string which indicates the control information by encoding the control information; and an interface which receives a bit stream comprising a bit string which indicates the status information of the fuel cell system and a bit string which indicates identification information of the fuel cell system from the fuel cell system through a serial communication line and transmits a bit stream comprising the generated bit string to the fuel cell system through the serial communication line, wherein the interface receives power from the fuel cell system or supplies power to the fuel cell system, through a power line, which is different from the serial communication line and the interface supplies power to the fuel cell system by transmitting successive bits corresponding to maximum transmissible voltage values of a signal to the fuel cell system after the transmitted bit stream.

20. The electronic device of claim 19, wherein the processor obtains the identification information and the status information from the received bit stream and generates the control information of the fuel cell system based on the obtained identification information and the obtained status information.

21. The electronic device of claim 19, wherein the interface receives power from the fuel cell system or supplies power to the fuel cell system, through the serial communication line.

* * * * *